United States Patent [19]
Nakamoto et al.

[11] Patent Number: 4,561,527
[45] Date of Patent: Dec. 31, 1985

[54] ELECTRIC PARKING BRAKE SYSTEM FOR A VEHICLE

[75] Inventors: Hiromasa Nakamoto; Yukinobu Natsuaki; Osamu Michihira; Futoshi Shoji, all of Hiroshima, Japan

[73] Assignee: Mazda Motor Corporation, Hiroshima, Japan

[21] Appl. No.: 575,742

[22] Filed: Jan. 31, 1984

[30] Foreign Application Priority Data

| Jan. 31, 1983 | [JP] | Japan | 58-15008 |
| Jan. 31, 1983 | [JP] | Japan | 58-15010 |
| Jan. 31, 1983 | [JP] | Japan | 58-15009 |
| Feb. 4, 1983 | [JP] | Japan | 58-17936 |
| Feb. 4, 1983 | [JP] | Japan | 58-17937 |

[51] Int. Cl.$^4$ .......................................... B60K 41/20
[52] U.S. Cl. ..................................... 192/4 C; 192/35; 192/9
[58] Field of Search ............... 192/3 TR, 3 S, 3 M, 192/4 A, 4 C, 9, 1, 2, 0.072, 0.09, 0.055; 303/93, 105, 20

[56] References Cited

U.S. PATENT DOCUMENTS

| 3,763,975 | 10/1973 | Fontaine | 192/3 TR |
| 4,262,783 | 4/1981 | Scarrott et al. | 192/0.09 |
| 4,350,234 | 9/1982 | Suga et al. | 192/9 |

FOREIGN PATENT DOCUMENTS

| 21329 | 4/1973 | Japan . |
| 105429 | 12/1979 | Japan . |
| 140634 | 7/1980 | Japan . |

Primary Examiner—George H. Krizmanich
Attorney, Agent, or Firm—Murray, Whisenhunt and Ferguson

[57] ABSTRACT

An improved parking brake system for a vehicle capable of switching the operation of the parking brake between an automatic control mode and a manual control mode at the operator's will. The parking brake is applied and released by an electromagnetic device which is controlled by a brake-application command signal and a brake-release command signal produced by a controller. The controller is adapted to be manually switched between a manual brake-application and brake-release control mode and an automatic control mode under the action of a switch. A power supply circuit is provided which has a battery and an ignition power source for supplying power to the electromagnetic device. The power supply circuit is operatively connected with the switch in a manner such that power is supplied to the electromagnetic device from the battery when the switch is manually operated to switch the controller into the manual brake-application control mode, and from the ignition power source when the switch is manually operated to switch the controller into the manual brake-release control mode. With this arrangement, even if the switch is thrown into a position for releasing the parking brake during stoppage of the vehicle on a slope with the parking brake applied, the parking brake is not released but held applied so that accidental starting of the vehicle is positively prevented, whereby safety is improved.

8 Claims, 15 Drawing Figures

F I G. I
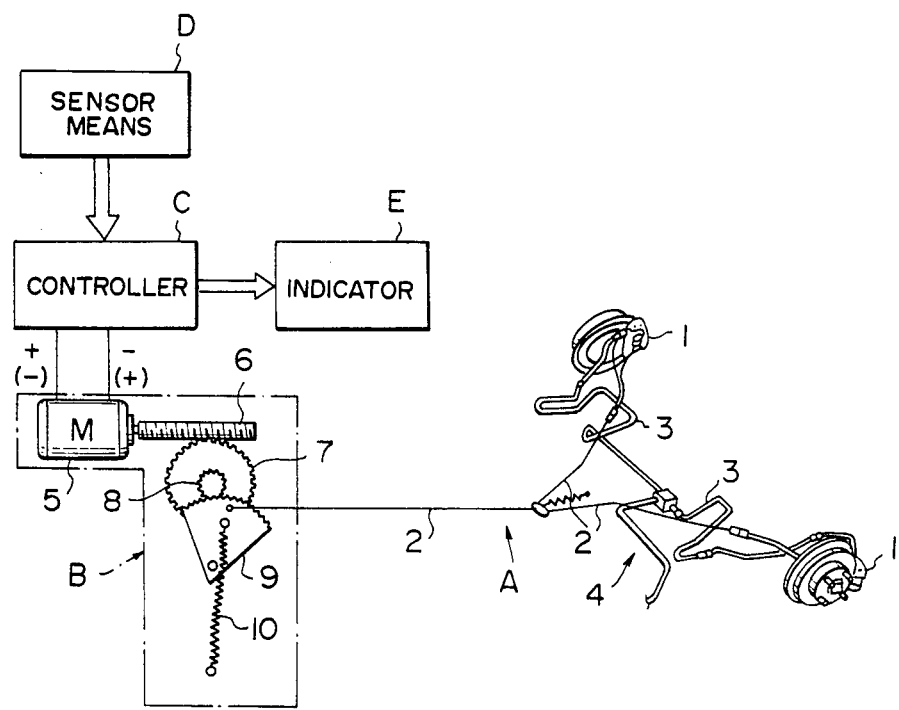

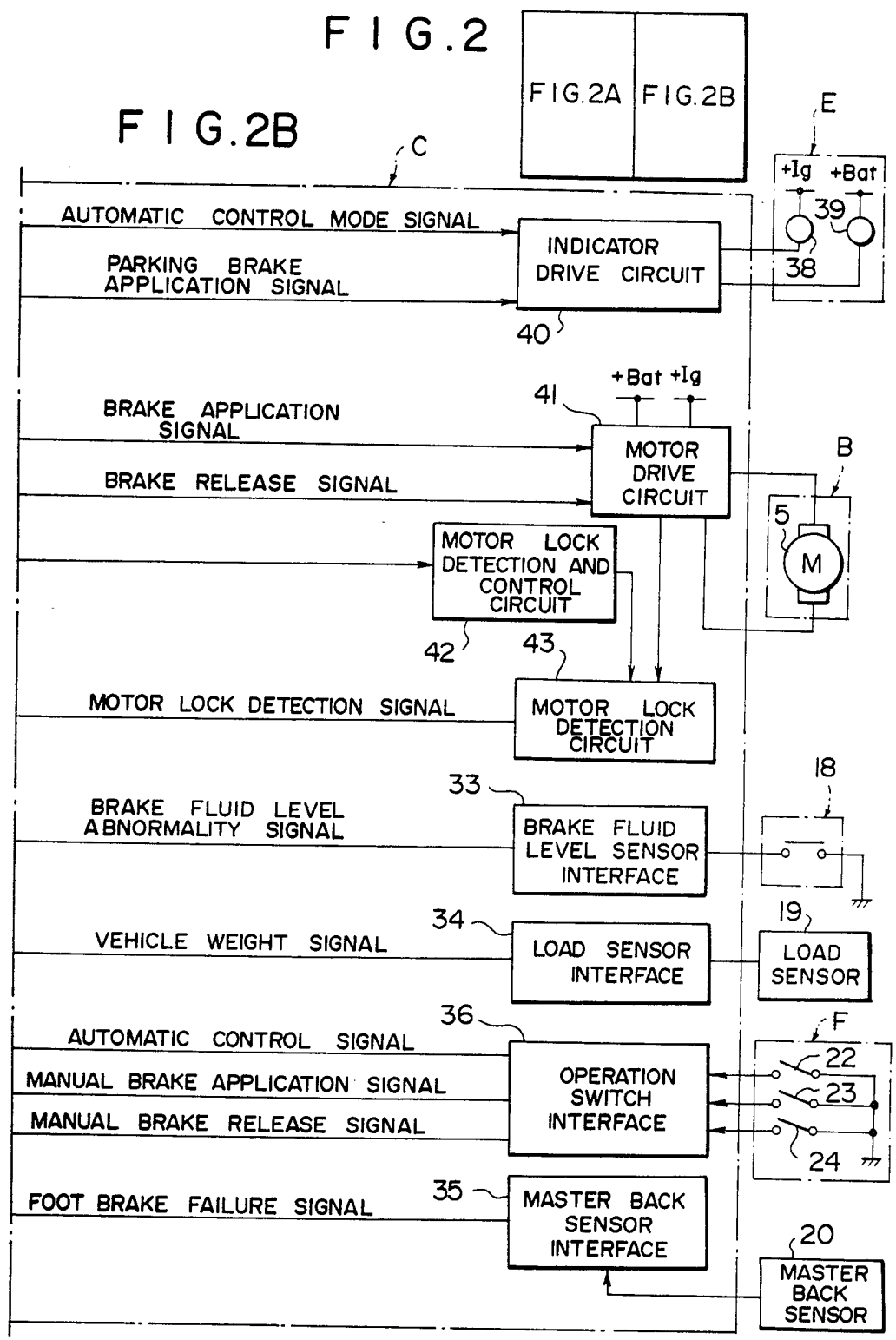

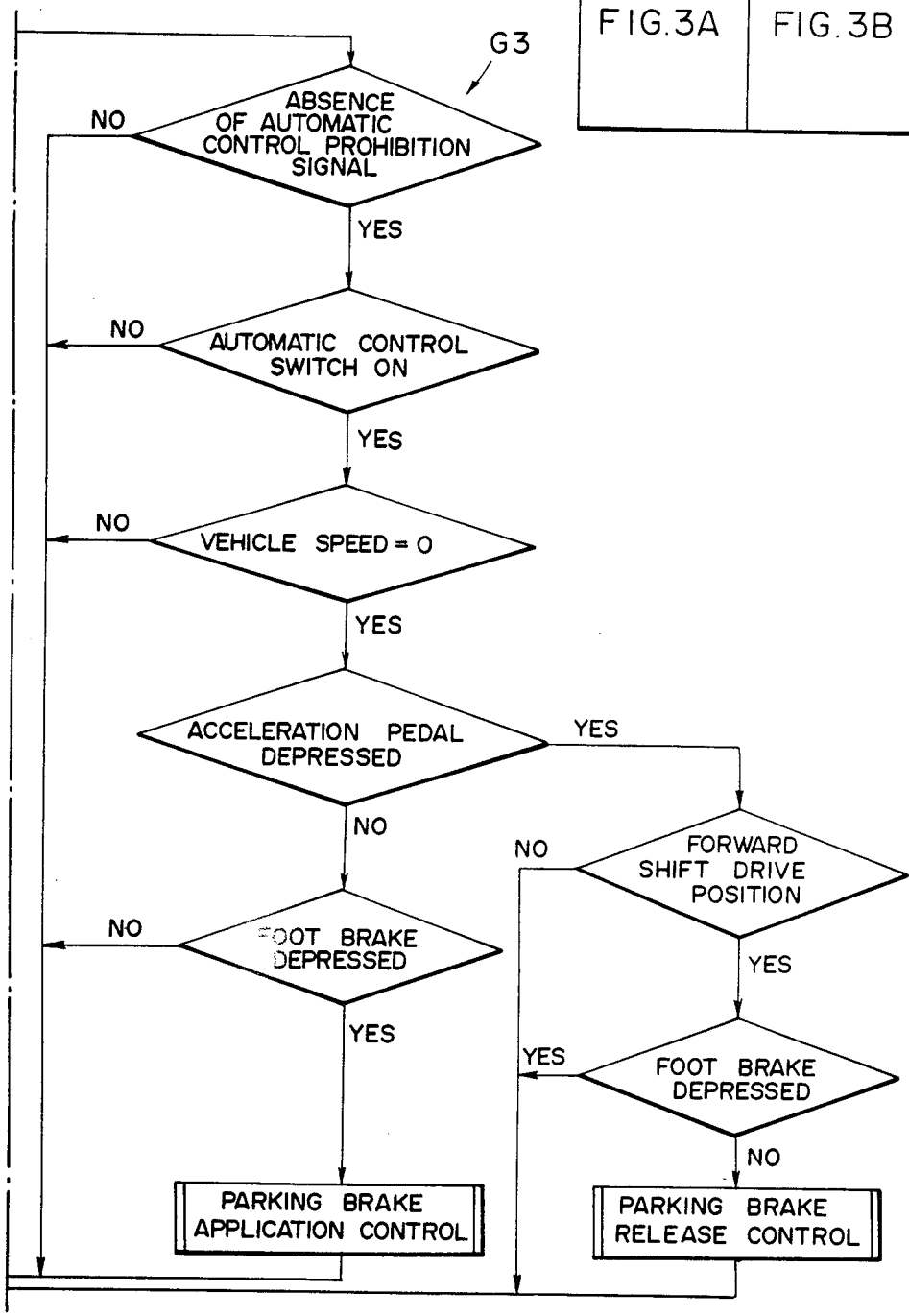

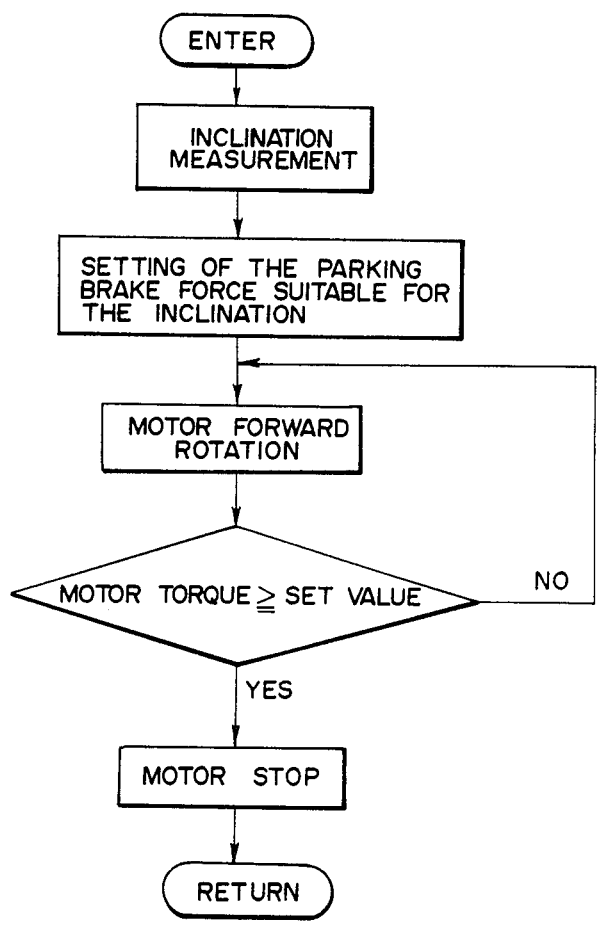

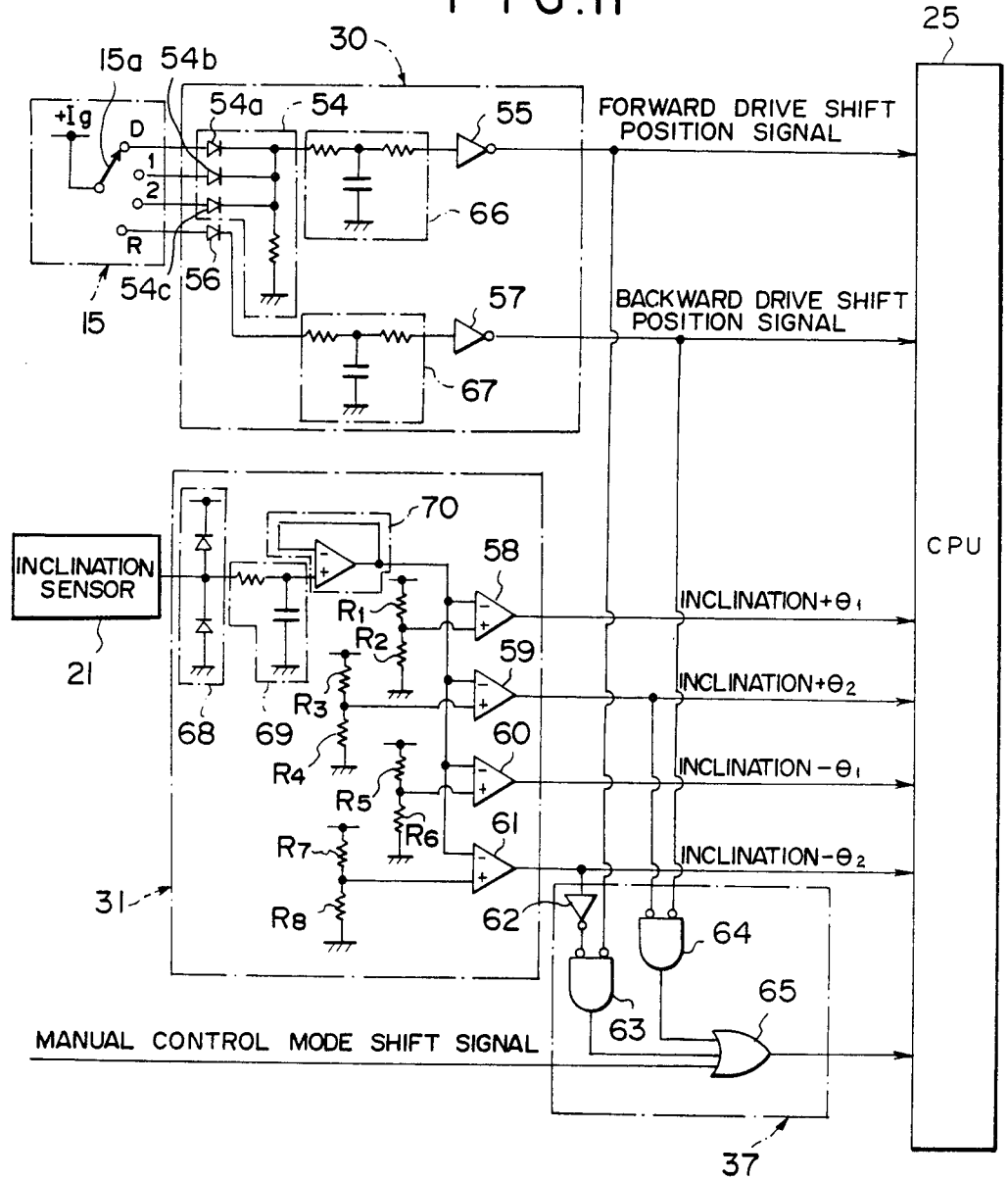

ELECTRIC PARKING BRAKE SYSTEM FOR A VEHICLE

BACKGROUND OF THE INVENTION

1. Field of the Invention

This invention relates to an electric parking brake system for a vehicle adapted to automatically control the application and release of a parking brake in accordance with the operating conditions of the vehicle.

2. Description of the Prior Art

In recent years, there have been proposed, in place of the conventional manual parking brake systems, various kinds of electric parking brake systems for vehicle use which include an electromagnetic means for actuating and de-actuating the parking brake system, a group of sensors for detecting the operating conditions of the vehicle, and a controller adapted to receive signals from the sensors for sending out a brake-application command signal or a brake-release command signal to the electromagnetic means so that application and release of the parking brake is controlled in an automatic manner in accordance with the operating conditions of the vehicle. For example, Japanese Unexamined Utility Model Publication No. 48(1973)-21329 discloses an electric parking brake system for a vehicle in which a parking brake is automatically actuated by means of a signal indicative of the depression of a foot brake and a signal indicative of the stopped condition of the vehicle, and de-actuated by means of a signal indicative of the depression of an accelerator pedal. Also, in the Japanese Unexamined Utility Model Publication No. 54(1979)-105429, there is described an electric parking brake system in which a parking brake is automatically actuated by means of a foot-brake depression signal and a push-button operation signal, and de-actuated by means of an accelerator-pedal depression signal or a clutch-pedal depression signal. Further, Japanese Unexamined Patent Publication No. 55(1980)-140634 teaches that a parking brake can be automatically released by means of an accelerator-pedal depression signal and a signal indicative of the shift-gear position of a transmission.

With such an automatically-controlled electric parking brake system, it is desirable from the point of view of safety to provide a manual switch which is adapted to be turned on or off, whenever necessary, by the vehicle operator for the purpose switching the parking brake from its automatic mode of operation to its manual mode of operation.

In this case, if the electromagnetic means for controlling the actuation and de-actuation of the parking brake is supplied with electricity from a battery, the parking brake will be released if the manual switch should be thrown into operation. This would be particularly dangerous if done, for example, by a child in the absence of the operator when the vehicle is parked on a slope with the engine stopped and the parking brake applied since it would free the vehicle to roll down the slope out of control.

Further, when a vehicle is driven in reverse, the driver will frequently stop the vehicle for the purpose of ensuring safety so that the parking brake will repeatedly applied and released. As a result, the backward movement of the vehicle is frequently interrupted by repeated stoppages and hence becomes jerky, thus making it impossible to back the vehicle up smoothly us, for example when backing into a garage.

Also, the parking brake is automatically released by depression of the accelerator pedal upon starting of the vehicle with the automatic control mode selected. Therefore, in order to release the parking brake in an automatic fashion during forward starting of the vehicle on a steep downhill grade or during backward starting on a steep uphill grade, it is required to depress the accelerator pedal. But, in this case, the depression of the accelerator pedal causes the vehicle to start rapidly, thus resulting in a dangerous situation from the point of safety.

Moreover, it would be very dangerous if the manual brake switch should be erroneously operated by the operator or other person in the vehicle to actuate the parking brake when the vehicle is travelling at a relatively high speed.

In addition, should the foot brake be abruptly depressed to brake the vehicle in an urgent manner, the wheels of the vehicle would be locked so that the speed signal from the locked wheels, representative of the travelling speed of the vehicle, would become nearly zero, wherein the vehicle is regarded as being stopped. As a result, the locked state of the wheels is maintained owing to the continued application of the parking brake, thus endangering further travel of the vehicle.

SUMMARY OF THE INVENTION

In view of the above, the present invention is intended to overcome the above-described difficulties and problems encountered in the prior art.

A broad and general object of the present invention is to change the power supply to the electromagnetic means for controlling the operation of the parking brake in accordance with whether a switch means, operated manually to change the parking brake between an automatic mode and a manual mode of operation, is thrown into the manual position or the automatic position, so that, when the switch means is placed by mistake into a position for releasing the parking brake during stoppage of the vehicle with the parking brake applied, the parking brake is not released but held in the applied state to prevent any movement of the vehicle, thus improving the safety in starting to a substantial extent.

A specific object of the present invention is to prevent the parking brake from being automatically applied or released during backward travel of the vehicle so that the vehicle can be driven to move smoothly without jerky motion at such a time, as when the vehicle is being backed into a garage.

Another specific object of the present invention is to prohibit the automatic release of the parking brake in accordance with the automatic control mode during the time when the vehicle is started to move forward on a steep descending slope or backward on a steep ascending slope, whereby abrupt starting of the vehicle can be avoided for improved safety in operation.

A further specific object of the present invention is to disable the manual control operation of the parking brake when the vehicle is travelling at a speed greater than a predetermined level so as to avoid dangerous situations resulting from an erroneous operation of the manual switch during travel of the vehicle for the purpose of enhancing safety in travelling.

A further specific object of the present invention is to prevent the parking brake from being applied immediately when the speed of the vehicle is reduced, upon rapid braking, by locking of the wheels to a level in which the vehicle is regarded as being stopped, so that dangerous wheel-lock as occurs upon rapid braking of the vehicle will not be maintained for an extended period of time, thus materially improving the travelling safety.

To achieve the above-described broad and general object of the present invention, there is provided an electric parking brake system for a vehicle which comprises: a parking brake; an electromagnetic means operable to apply and release the parking brake; a command signal producing means adapted to put out a brake-application command signal to the electromagnetic means; a switch means adapted to be manually operated to switch the operation of the command-signal producing means between a manual brake-application and brake-release control mode and an automatic control mode; a power supply circuit having a battery and an ignition power source for supplying power to the electromagnetic means, the power supply circuit being operatively connected with the switch means in a manner such that power is supplied to the electromagnetic means from the battery when the switch means is manually operated to switch the command-signal producing means into the manual brake-application control mode, and from the ignition power source when the switch means is manually operated to switch the command-signal producing means into the manual brake-release control mode.

The above and other objects, features and advantages of the present invention will become apparent from the following detailed description of embodiments when taken in conjunction with the accompanying drawings.

BRIEF DESCRIPTION OF THE DRAWINGS

FIG. 1 is a schematic view illustrating the overall arrangement of an electric parking brake system according to the present invention, FIG. 4 is a flow chart illustrating a sub-flow for controlling the application of the parking brake system, FIG. 11 is a circuit diagram showing examples of an automatic-control prohibiting circuit, a inclination sensor interface and a shift-position interface of FIG. 2.

DESCRIPTION OF THE PREFERRED EMBODIMENTS

Figure 2A:
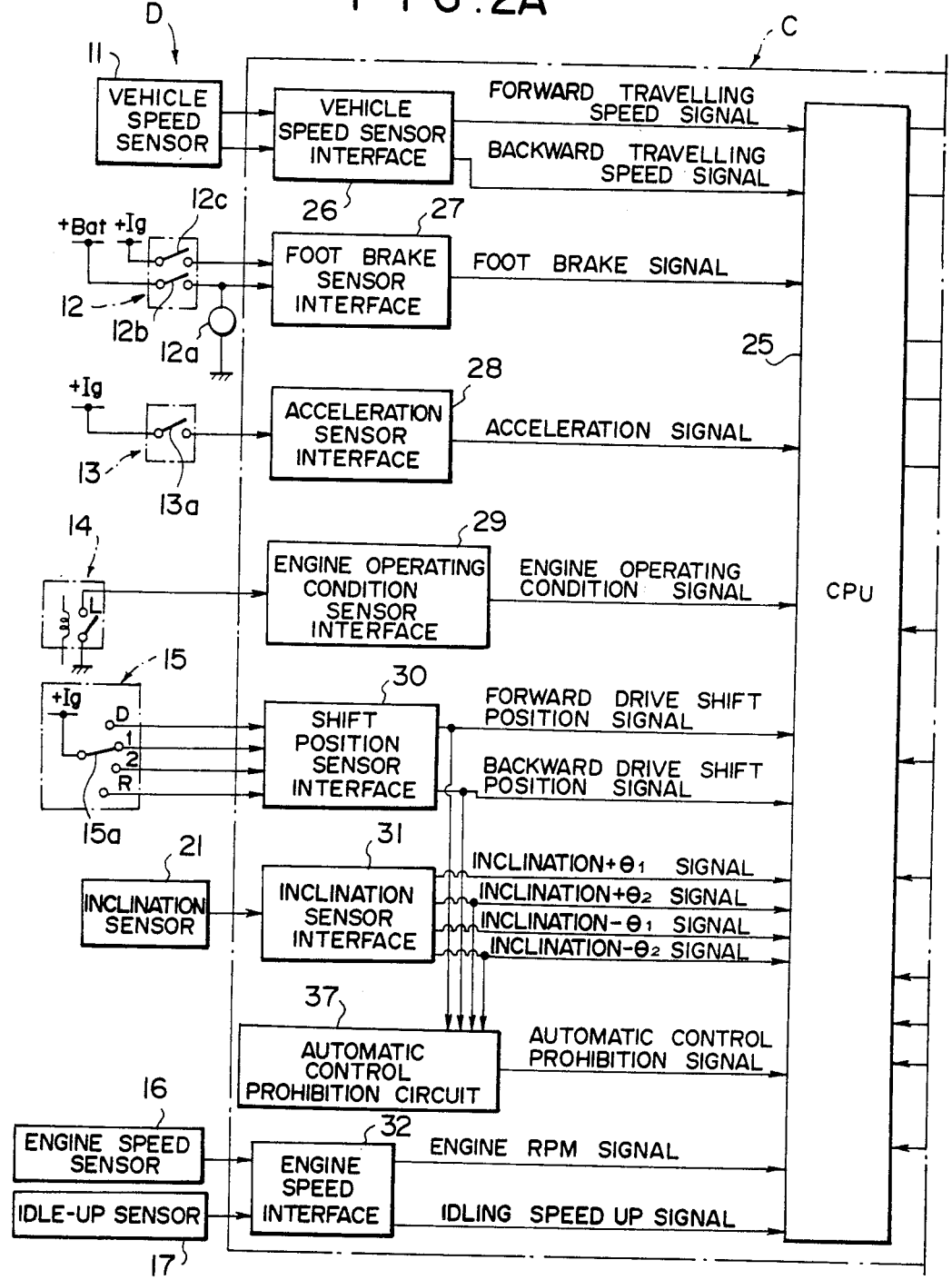
FIG. 2 is a block diagram illustrating the relationship of FIGS. 2A and 2B to one another, FIGS. 2A and 2B, together illustrate the details of the electric parking brake system.

Referring to the drawings and first to FIG. 1, there is schematically shown a brake system for a vehicle which includes a pair of right and left rear disc brakes 1, 1, a parking brake system A having a parking brake cable 2 connected to the respective rear disc brakes 1, 1 and adapted to be pulled or slacked to apply or release the brakes 1, 1, and a main brake system 4 having a flexible hoses 3 connected to the respective rear disc brakes 1, 1 and adapted to feed pressurized fluid to the brakes 1, 1 upon depression of a brake pedal (not shown) for application of the brakes 1, 1.

The parking brake system A is actuated or de-actuated under the control of an electromagnetic means, generally designated at reference character B, which comprises a reversible motor 5, a worm 6 provided on the rotation shaft of the motor 5, a worm gear 7 in meshing engagement with the worm 6, a speed-reduction gear 8 formed concentrically and integrally with the worm gear 7, and a sector gear 9 meshed with the speed-reduction gear 8, the parking brake cable 2 being connected at its one end to the sector gear 9. With this arrangement, when the motor 5 is driven to rotate in the forward direction, the parking brake cable 2 is drown or pulled to the left in FIG. 1 through the gears 7 to 9 thereby to actuate the parking brake A, whereas upon reverse rotation of the motor 2, the parking brake cable 2 is slackened or returned to the original condition through the action of the gears 7 to 9, thereby to release the parking brake A. Connected to the sector gear 9 is a spring 10 which acts to urge the sector gear 9 to rotate in the clockwise or counterclockwise direction, as viewed in FIG. 1, with change-over point at which the action of the spring 10 switches from one direction to the other being the position at which the spring 10 extends through the center of rotation or pivot point of the sector gear 9. Thus, the spring 10 serves to assist the brake-applying and brake-releasing operations of the parking brake A caused under the drive of the motor 5.

Also illustrated in FIG. 1 are a controller C for feeding a brake-application command signal and a brake-release command signal to the electromagnetic means B or the motor 5; a group of sensors D adapted to detect the various operating conditions of the vehicle and send out signals representative of the operating conditions thus detected; and an indicator E for displaying the output conditions of the controller C. The controller C serves to control the operation of the electromagnetic means B or the direction of rotation of the motor 5 in accordance with the detected operating conditions of the vehicle on the basis of the signals from the sensors D.

FIG. 2 shows the detailed construction of the controller C in association with other elements. Referring first to the group of sensors D, the sensors D include a vehicle speed sensor 11 adapted to detect the speed of the vehicle for producing as its output a vehicle speed signal representative of the vehicle speed detected; a foot brake sensor 12 for detecting whether the foot brake 4 is depressed or not; an acceleration sensor 13 for detecting whether the accelerator pedal is depressed or not by means of an acceleration switch 13a which is turned on upon depression of the accelerator pedal; an engine operating condition sensor 14 for detecting the operating conditions of the engine by means of a terminal L of a regulator; a shift-position sensor 15 adapted to detect the selected shift position of the transmission by means of a gear-position switch 15a which is switched on simultaneously when the transmission is put into the driving range, the first-speed range, the second-speed range and the reverse-speed range, an inclination sensor 21 for detecting the inclination of the vehicle and indicating the inclination of the vehicle on an ascending slope as "+ (plus)" and on a descending slope as "− (minus)", the inclination sensor 21 producing as an output a voltage signal and having an output characteristic in which the output voltage increases with increasing angle of inclination $\theta$; an engine speed sensor 16 for detecting the number of revolutions per minute (R.P.M.) of the engine by means of ignition pulses; an idle-up sensor 17 for detecting the idle-up condition of the engine; a brake-fluid-level sensor 18 for detecting any abnormality in the brake-fluid or a failure in the main or foot brake system 4; a load sensor 19 for detecting the weight of the vehicle; and a master back sensor 20 for detecting any abnormality or failure in the main brake system 4. The vehicle speed sensor 11 is adapted to produce a vehicle speed signal which comprises two pulse signals having a phase difference of 90°, the vehicle speed signal serving to indicate the direction (forward or backward) of the vehicle speed or travel by whether the pulse phase of one of the pulse signals is ahead or behind that of the other. Details of such a vehicle speed sensor are disclosed in Japanese Unexamined Utility Model Publication No. 55(1980)-71962. Also, the foot brake sensor 12 comprises the stop lamp switch 12b for turning on or off the stop lamp 12a and the exclusive brake switch 12c arranged in parallel relation with each other, these switches 12b and 12c being turned on upon depression of the foot brake 4 so as to produce a foot brake signal.

Reference character F designates a manually operated switch which is comprised of an automatic control switch 22 adapted to be manually turned on or off by the operator for switching the controller C into automatic mode; a manual brake application switch 23 adapted to be turned on or off by the operator so as to put the parking brake applying operation of the controller C into manual mode; and a manual brake releasing switch 24 adapted to be turned on or off by the operator so as to put the parking brake releasing operation of the controller C into manual mode. These switches 22 to 24, when turned on, produce output signals which are fed to the controller C.

On the other hand, the controller C comprises: a central processing unit (abbreviated hereinafter as CPU) 25; a vehicle speed sensor interface 26 adapted to receive the output of the vehicle speed sensor and send out a forward travelling speed signal indicative of the forward travel of the vehicle or a backward travelling speed signal indicative of the backward travel of the vehicle to the CPU 25; a foot brake sensor interface 27 adapted to receive the outputs of the foot brake sensor 12 including the stop lamp switch 12b and the exclusive brake switch 12c and feed a foot brake signal to the CPU 25; an acceleration sensor interface 28 adapted to receive the output of the acceleration sensor 13 and feed an acceleration signal to the CPU 25; an engine operating condition sensor interface 29 adapted to receive the output of the engine operating condition sensor 14 and feed an engine operating condition signal to the CPU 25; a shift position sensor interface 30 adapted to receive the output of the shift position sensor 15 indicative of the selected shift position of the shift gear and send out a forward drive shift position signal or a backward drive shift position signal to the CPU 25; an inclination sensor interface 31 adapted to receive the output of the inclination sensor 21 and send out one of inclination signals ($+\theta 1$, $+\theta 2$, $-\theta 1$ and $-\theta 2$: $|\theta 2| > |\theta 1|$) to the CPU 25; an engine speed interface 32 adapted to receive the respective outputs of the engine R.P.M. sensor 16 and the idle-up sensor 17 to feed an engine R.P.M. signal and an idling speed up signal to the CPU 25; a brake fluid level sensor interface 33 adapted to receive the output of the brake fluid level sensor 18 and feed a brake fluid level abnormality signal to the CPU 25 when the brake fluid level is abnormal or below a predetermined level; a load sensor interface 34 adapted to receive the output of the load sensor 19 and feed a load signal indicative of the load on the vehicle to the CPU 25; and a master back sensor interface 35 adapted to receive the output of the master back sensor 20 and feed a foot brake failure signal to the CPU 25 when the foot brake fails.

The controller C further comprises an operation switch interface 36 which is adapted to receive the outputs of switch means F including the automatic control switch 22, the manual brake application switch 23 and the manual brake release switch 24, and send out an automatic control signal, a manual brake application signal and a manual brake release signal to the CPU 25, wherein the manual brake application signal and the manual brake release signal are processed in preference to the automatic control signal.

The controller C is also provided with an automatic control prohibition circuit 37 which acts, upon receipt of a forward drive shift position signal or a backward drive shift position signal from the shift position sensor interface 30 and an inclination signal ($+\theta 2$ or $-\theta 2$) form the inclination sensor interface 31, to put out an automatic control prohibition signal to the CPU 25 so that automatic control of the parking brake A is prohibited when the vehicle is driven to travel backwardly or to start forwardly (backwardly) on a descending (ascending) slope with an inclination greater than a predetermined angle of inclination ($|\theta 2|$).

In addition to the above, the controller C is further provided with an indicator drive circuit 40 which is operated, upon receipt of an automatic control mode signal and a parking brake application signal from the CPU 25, to actuate an automatic control mode indicator 38 and a parking brake actuation indicator 39 so as to display the automatic control mode and the actuation of the parking brake, respectively; a motor drive circuit 41 which is adapted to drive the motor 5 of the electromagnetic means B to rotate it in the forward or reverse direction upon receipt of a brake application signal or a brake release signal from the CPU 25; a motor lock detection and control circuit 42 which serves to set a reference voltage corresponding to the locked state of the motor 5 in accordance with the inclination signal and the vehicle weight signal from the CPU 25; and a motor lock detection circuit 43 which acts, when applied with the reference voltage from the motor lock detection and control circuit 42 and the output voltage of the motor drive circuit 41, to judge whether the motor 5 is locked or not and to put out a motor lock detection signal to the CPU 25 upon determining that the motor 5 is locked, whereby the CPU 25 is operated to stop producing the parking brake application command signal when the motor 5 is in the locked state.

Figure 3A:
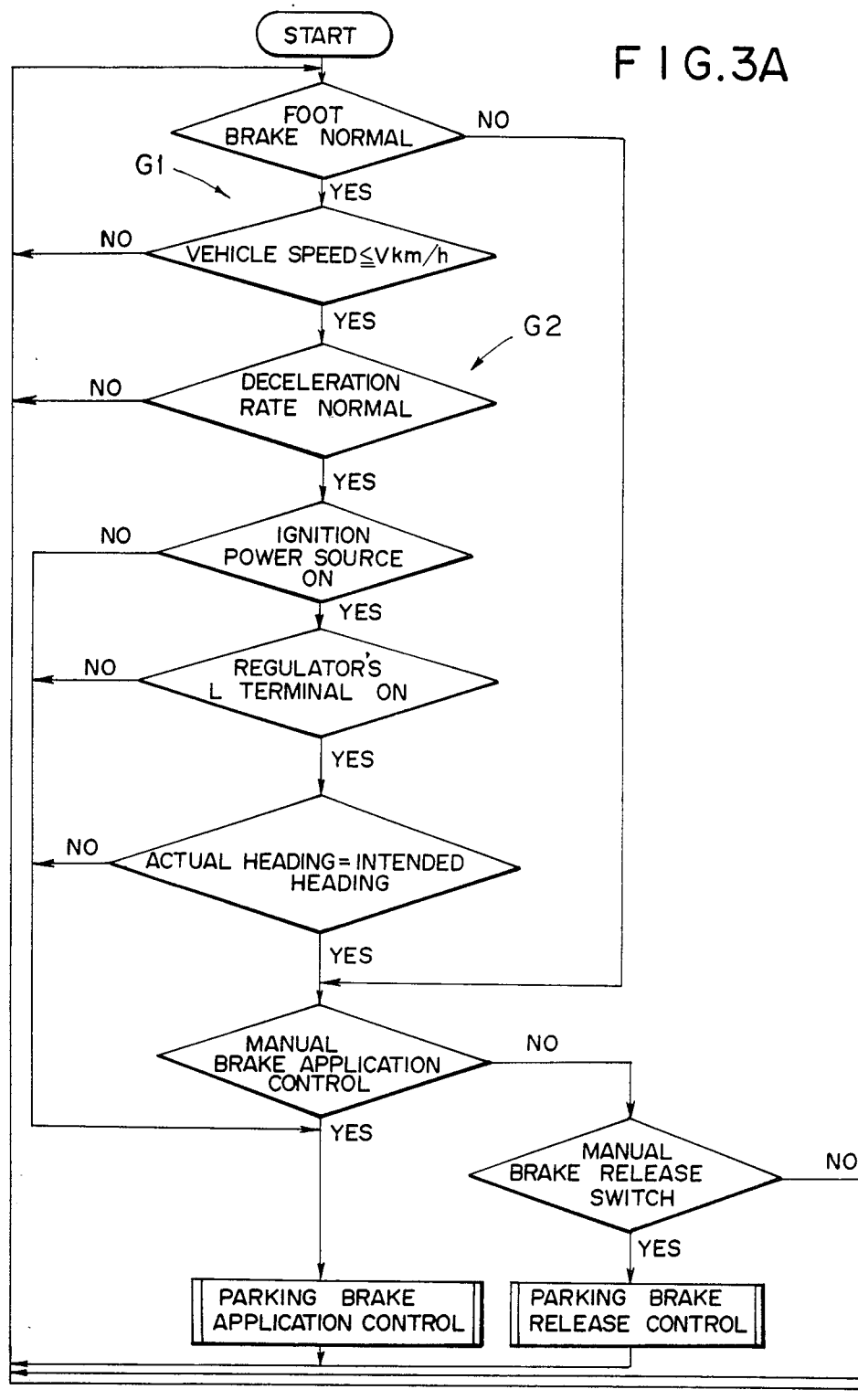
FIG. 3 is a block diagram illustrating the relationship of FIGS. 3A and 3B to one another, FIGS. 3A and 3B together comprise a flow chart illustrating the main flow of the operation of the central processing unit (CPU) of the controller shown in FIGS. 2A and 2B.

Now, description is made of the main flow of the operation of the CPU 25 with reference to FIG. 3.

First, the CPU 25 operates to judge whether or not the foot brake 4 is operating normally. This judgement is effected on the basis of the presence or absence of the brake fluid level abnormality detection signal from the brake fluid level sensor interface 33 and of the foot brake failure sensor signal from the master back sensor interface 35. In this case, if the result is "YES", i.e. if the foot brake 4 is normal, then judgement is made from the vehicle speed signal from the vehicle speed sensor interface 26 as to whether or not the vehicle speed is less than a predetermined value of V km/h as well as whether or not the deceleration rate of the vehicle speed is normal, as will be described later in detail. In cases where these judgements result in "YES", that is, if the vehicle speed is less than the value of V km/h and the deceleration rate of the vehicle speed is normal, it is concluded that the parking brake A can be applied at the detected vehicle speed, but when these judgements result in "NO", the operation of the CPU 25 is returned to the starting point. Thus, the brake fluid level sensor interface 33, the master back sensor interface 35, the vehicle speed sensor interface 26 and the CPU 25 jointly constitute a switching operation prohibiting means G1 which acts to prohibit the actuation of the operation switch or switch means F when the vehicle speed is greater than the predetermined value of V km/h, as described later.

Subsequently, in a case where the vehicle speed is judged to permit the actuation of the parking brake A, then judgements are made from the presence or absence of the engine operating condition signal from the engine operating condition sensor interface 29 as to whether or not the ignition power source Ig is turned on, as well as whether or not the L terminal of the regulator is turned on. On this occasion, if these judgements are "YES", that is, it is judged that the ignition power source is turned on and the engine operation signal is present, the engine is concluded to be in operation. Thereafter, from the forward travel vehicle speed signal or the backward travel vehicle speed signal from the vehicle speed sensor interface 26 and the forward drive or the backward drive shift position signal from the shift position sensor interface 30, it is judged whether or not there is concordance between the actual direction of travel of the vehicle and the intended direction of travel thereof. If the result is "YES", that is, if the actual direction is in concordance with the intended direction, or if there is an abnormality in the operation of the foot brake 4, then it is determined on the basis of the presence or absence of the manual brake application signal from the operation switch interface 36 whether or not the manual brake application switch 23 is turned on. In this manner, the switching operation prohibiting means G1 is disabled or nullified during failure of the foot brake 4.

In this case, if the result is "YES", that is, if the manual brake application switch 23 is turned on, the CPU 25 acts to produce a brake application command signal in accordance with a sub-flow of operation, as shown in FIG. 4, so as to control the brake applying operation of the parking brake A, as in cases where the engine is out of operation, that is, where both the ignition power source Ig and the L terminal of the regulator are cut off, and where there is discordance between the actual direction of travel and the intended direction of the vehicle.

Specifically, in the sub-flow for controlling the operation of the parking brake A, as viewed in FIG. 4, the CPU 25 first measures the angle of inclination of the vehicle with respect to the horizontal by means of the inclination signal from the inclination sensor interface 31, and then sets the operation force of the parking brake A required for the inclination measured. Thereafter, a brake application command signal is put out by the CPU 25 to the motor 5 of the electromagnetic means B whereby the motor 5 is driven to rotate in the forward direction. The torque of the motor 5 is compared with the set force for the parking brake A and the motor 5 is operated until the motor torque increases to exceed the set force of the parking brake A. At the instant when the motor torque reaches the set force for the parking brake A, the brake application command signal is stopped to de-energize the motor 5 so that the parking brake A is put into a locked state of brake application.

On the other hand, in case where the manual brake application switch 23 is turned off or in case the judgement on whether or not the manual brake release switch 24 is turned on mode on the basis of the presence or absence of the manual brake release signal from the operation switch interface 36 is "NO". If this judgement results in "YES", that is, if the manual brake release switch 24 is judged to be turned on, the CPU 25 acts to produce a brake release command signal in accordance with a sub-flow of operation, as shown in FIG. 5, so as to control the brake-releasing operation of the parking brake A.

Figure 5:
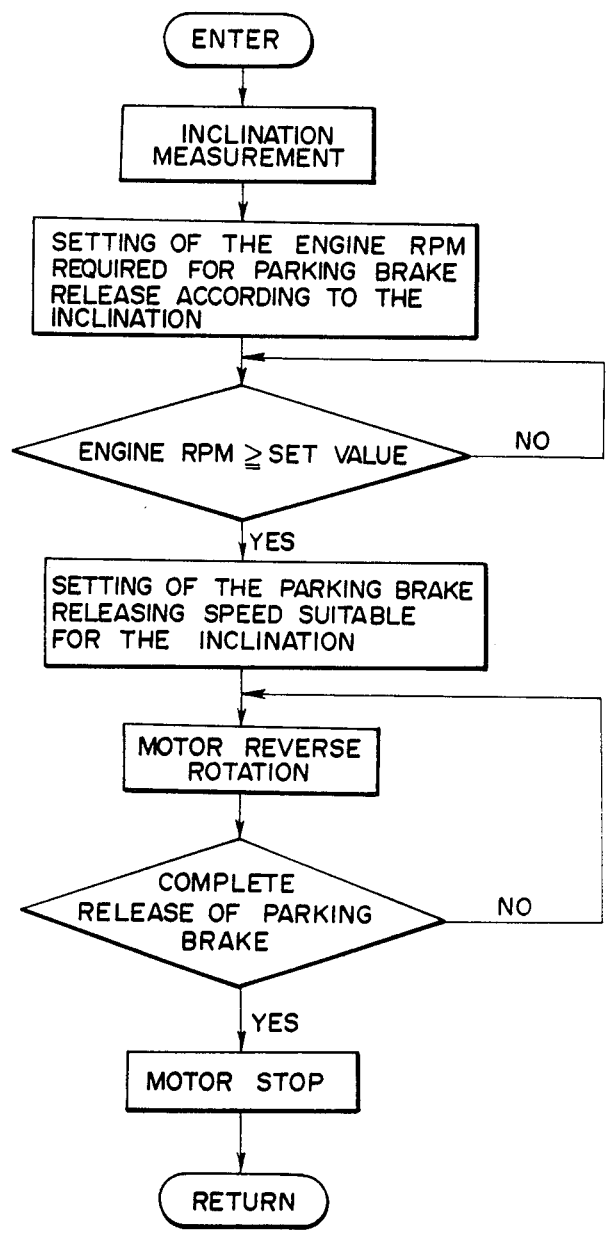
FIG. 5 is a flow chart illustrating a sub-flow for controlling the release of the parking brake system.

Namely, in the sub-flow for controlling the brake releasing operation of the parking brake A, as viewed in FIG. 5, the CPU 25 first measures the angle of inclination of the vehicle by means of the inclination signal and then sets an engine R.P.M. required for releasing the parking brake A in accordance with the inclination measured. After it is recognized from the engine speed signal that the actual R.P.M. of the engine has increased to exceed the set value, the CPU 25 sets an appropriate brake releasing speed of the parking brake A required for the measured inclination and puts out a brake releasing command signal to the motor 5 of the electromagnetic means B so that the motor 5 is driven to rotate in the reverse direction at the set brake releasing speed. The operation of the motor 5 is kept on until release of the parking brake A is completed, and upon completion of release of the parking brake A, the brake releasing command signal is stopped to put the motor 5 out of operation. In this manner, the releasing operation of the parking brake B is controlled and completed.

Further, in case where the manual brake release switch 24 is cut off or in case of "NO", judgements are made as to whether or not the automatic control prohibition circuit 37 produces an automatic control prohibition signal as well as to whether or not the automatic control switch 22 is turned on, on the basis of the presence or absence of the automatic control signal from the operation switch interface 36. In this case, if these judgements result in "YES", that is, if an automatic control prohibition signal is issued and the automatic control switch 22 is turned on, it is recognized that the parking brake A is in an automatic control mode, and if any of these judgements is "NO", the operation of the CPU 25 is returned to the starting point.

Subsequently, in the automatic control mode, the CPU 25 first determines from the vehicle speed signal whether or not the vehicle speed is substantially zero, and in case of "NO", the operation of the CPU 25 is returned to the starting point. On the other hand, in case of "YES", the CPU 25 judges, based on the presence or absence of the acceleration signal from the acceleration sensor interface 28, whether or not the accelerator pedal is depressed, and if the result is "NO", that is, if the accelerator pedal is not depressed, the CPU 25 further determines whether or not the foot brake 4 is depressed on the basis of the presence or absence of the foot brake signal from the foot brake sensor interface 27. In case of "YES", meaning that the foot brake 4 is depressed, the CPU 25 judges that the vehicle speed is reduced due to the depression of the foot brake 4, to such an extent that the vehicle can be regarded to have stopped, and produces a brake application command signal whereby the operation of the parking brake A is controlled in accordance with the sub-flow shown in FIG. 4, as described hereinbefore. In this connection, it is to be noted that when the foot brake 4 is not depressed, that is, in case of "NO", the operation of the CPU 25 is returned to the starting point.

In contrast to the above, in the case where the acceleration pedal is depressed or in case of "YES", the CPU 25 determines, based on the presence or absence of the forward drive shift position signal from the shift position sensor interface 30, whether or not the shift gear of the transmission is in a forward drive shift position, and in case of "NO", the operation of the CPU 25 is returned to the starting point. On the other hand, in case of "YES", the CPU 25 further judges, based on the presence or absence of the foot brake signal, whether or not the foot brake 4 is depressed, and in case of "NO", wherein the foot brake 4 is not depressed, produces a brake release command signal whereby the parking brake A is released in an automatic control mode in accordance with the sub-flow shown in FIG. 5, as referred to above. In this connection, it is to be noted that in case of "YES", wherein the foot brake 4 is depressed, the operation of the CPU 25 is returned to the starting point.

Accordingly, in the above embodiment, when the vehicle is travelling at a speed greater than the predetermined value of V km/h, the operation of the switch means F including the automatic control switch 22, the manual brake application switch 23 and the manual brake release switch 24 is prohibited so that it is made impossible to apply or release the parking brake A by means of the switch means F. Thus, even if the manual brake application switch 23 is turned on by mistake, the parking brake A will not be applied because the manual control of the parking brake A by means of the controller C is disabled. As a result, the dangerous situation of the parking brake A being applied by erroneous operation of the switch means F during travel of the vehicle is avoided in a reliable manner, thereby improving safety in travelling. On the other hand, when the vehicle speed is smaller than the predetermined value of V km/h, the operation of the switch means F is not prohibited so that the parking brake A can be operated in an automatic control mode or in a manual control mode, as desired, in accordance with inherent operation of the switch means F. This ensures, in combination with free changeability of the control mode of the parking brake A between the automatic and manual control modes, good versatility in operation of the parking brake A.

Moreover, since the function of the operation switch actuation prohibiting means G1 for prohibiting the operation of the switch means F is disabled during failure of the foot or main brake 4 even where the vehicle speed is greater than the set value of V km/h, the operator can apply or release the parking brake A, as required, at his own will by appropriately manipulating the switch means F at a time such as when the foot brake fails. This is most desirable from the point of safety.

Figure 6:
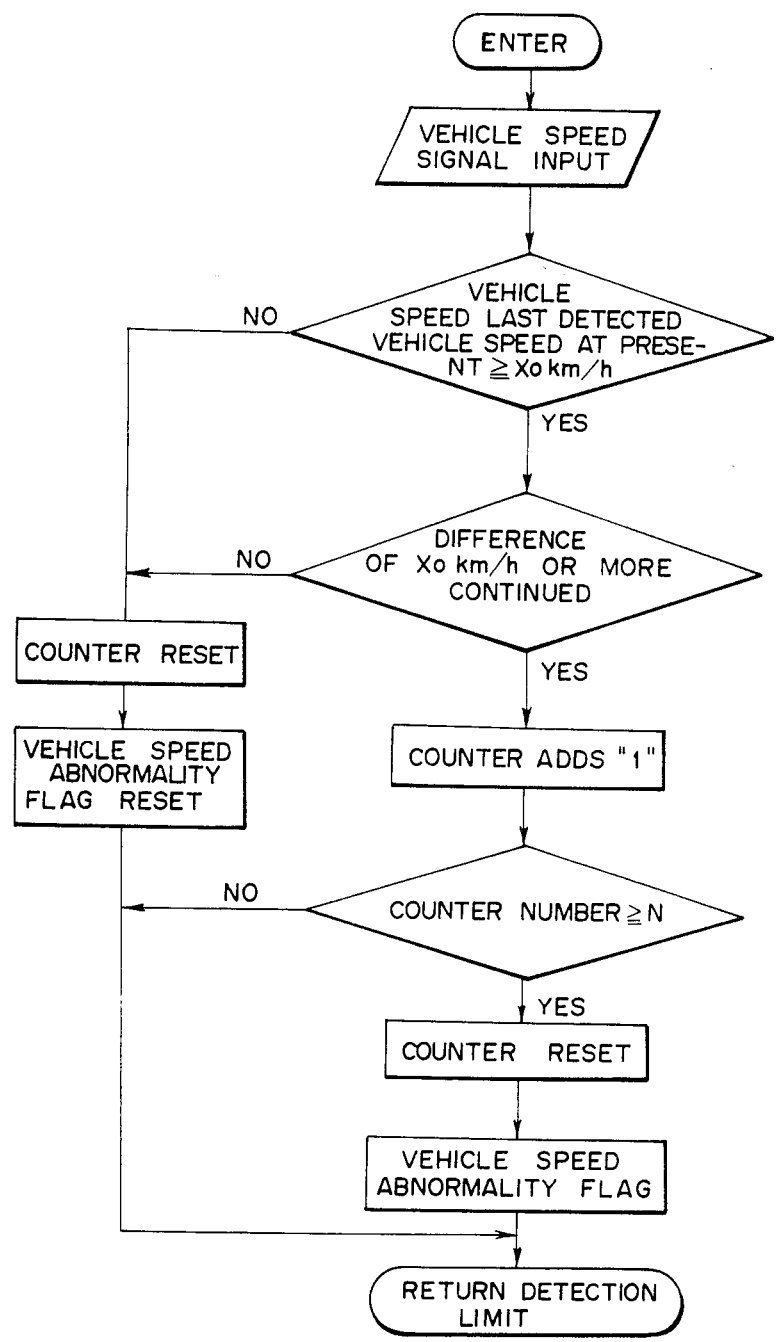
FIG. 6 is a flow chart showing a concrete processing routine for judging whether or not the deceleration rate of the vehicle is normal.

Now, reference is made to the judgement process in FIG. 3 as to whether or not the deceleration rate of the vehicle speed is normal. As shown in FIG. 6, a vehicle speed signal, representative of the vehicle speed varying with time, is fed to the CPU 25 so that the vehicle speed at present is compared with the vehicle speed at an earlier time for the purpose of judging whether or not the difference between the present vehicle speed and the earlier vehicle speed is greater than a preset value of Xo km/h. In this case, if the result of such a judgement is "YES", wherein the difference between the vehicle speeds is greater than Xo km/h, the CPU 25 further checks whether or not the difference remains greater than Xo km/h for over a certain definite length of time, and if the result is "YES", a counter (not shown) is operated to add "+1". Then, the CPU 25 determines whether or not the count number of the counter exceeds N times, and in case of "YES", resets the counter and at the same time raises a vehicle speed abnormality flag representative of an abnormal vehicle speed. On the other hand, in case where the vehicle speed difference is smaller than Xo km/h or where the vehicle speed difference does not remain greater than Xo km/h for the definite period of time, the CPU 25 resets the counter and the vehicle speed abnormality flag. The above series of operations is repeated at an interval of time of $\Delta t$.

Specifically, the deceleration rate of the vehicle speed is expressed as follows.

$$\eta = \{f(t+\Delta t) - f(t)\}/\Delta t$$

where $\eta$ is the deceleration rate; t is time; $\Delta t$ is the definite period of time; and f(t) is the vehicle speed at time t. Thus, the deceleration rate of the vehicle speed $\eta$ is taken as the change rate of the vehicle speed f during the period of time $\Delta t$, and the difference $\{f(t+\Delta t) - f(t)\}$ in the vehicle speed at each interval of $\Delta t$ is calculated so that when the difference remains greater than Xo km/h over N times or for a duration of time of $N.\Delta t$ or more, the vehicle speed abnormality flag is raised, thereby canceling the judgement that the vehicle speed is substantially zero as in FIG. 3. In this manner, a parking brake application prohibiting means G2 is constructed which acts, when the deceleration rate of the vehicle speed, representative of the traveling condition of the vehicle, exceeds a preset level, to provide a brake application prohibition time for delaying the issuance of a brake application command signal which would otherwise take place when it is judged that the vehicle speed is reduced by depression of the foot brake to such an extent that the vehicle can be regarded to have stopped.

Figure 9:
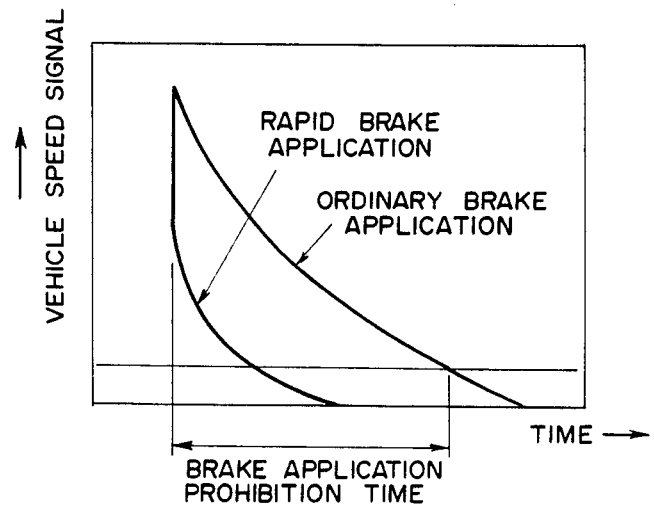
FIG. 9 is a graphic representation showing vehicle-speed signal characteristics at the time of rapid brake application with wheel-lock and at the time of gradual or ordinary brake application without wheel-lock.

In this connection, it should be understood that the parking brake application prohibiting means G2 may be constructed so as not to judge whether or not the deceleration rate of the vehicle speed is normal as referred to above but instead so as to set a definite period of time corresponding to the vehicle speed and to provide a predetermined length of time after application of the foot brake 4 for prohibiting the application of the parking brake A. In other words, as seen from FIG. 9, when the foot brake 4 is depressed, the length of time from the depression of the foot brake pedal until the time when the vehicle speed is reduced to zero at the time of rapid brake application is different from and shorter than that at the time of normal brake application during ordinary travel of a vehicle. For this reason, if the brake application prohibition time is set on the basis of the length of time over which the vehicle speed is reduced to zero upon normal brake application during ordinary travel, the vehicle speed signal representative of the vehicle speed of zero upon rapid brake application can be canceled.

Figure 7:
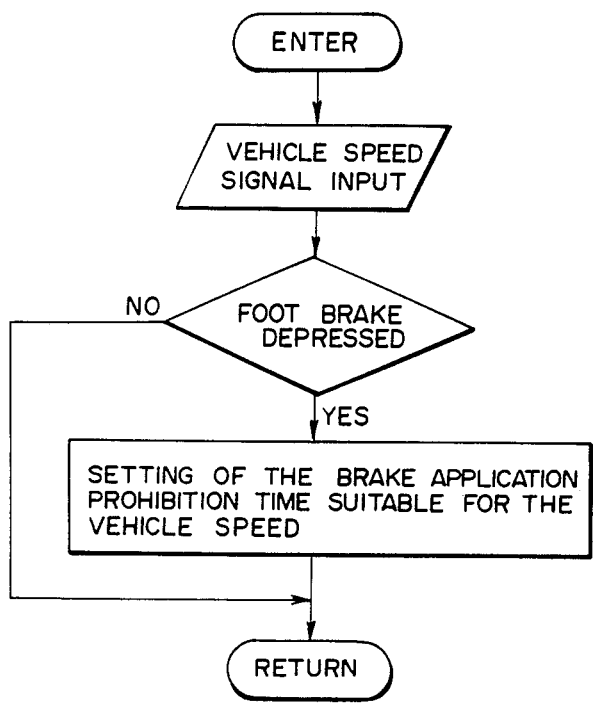
FIG. 7 is a flow chart showing a concrete processing routine for setting a parking-brake application prohibiting time.

In this case, the processing for setting the parking brake application prohibition time, which takes the place of the judgement as to whether or not the deceleration rate of the vehicle speed is normal as in FIG. 3, is performed as illustrated in FIG. 7. First, the vehicle speed signal is fed to the CPU 25 in order to determine whether or not the foot brake 4 is depressed, and in case of "YES", indicative of the depressed condition of the foot brake 4, that is, during brake application, an appropriate brake application prohibition time is set which corresponds to the vehicle speed and which is becomes longer as the vehicle speed increases. On the other hand, in case of "NO", indicative of the non-depression of the foot brake, the processing is completed.

Figure 8:
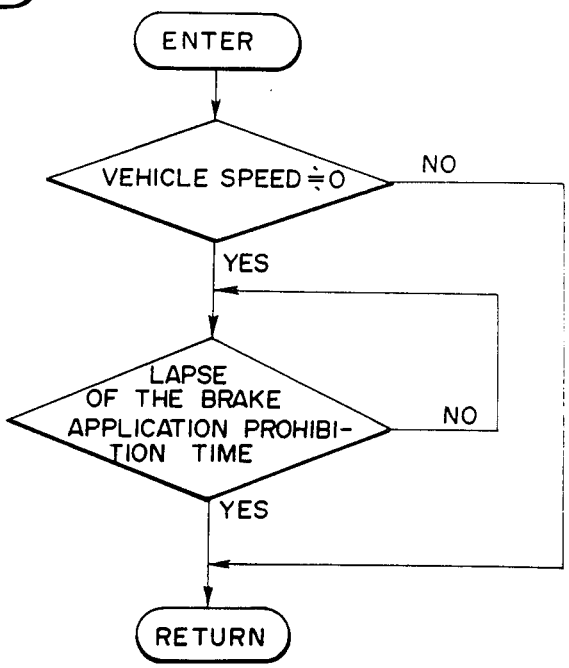
FIG. 8 is a flow chart showing a concrete processing routine for judging whether or not the vehicle speed is nearly zero.

Further, FIG. 8 illustrates a processing routine for judging whether or not the vehicle speed is substantially zero. As seen from FIG. 8, the CPU 25 judges from the vehicle speed signal whether or not the vehicle speed is substantially zero. In case of "YES", the CPU 25 further determines whether or not the above set brake application prohibition time has elapsed, and after the lapse of the brake application prohibition time, produces a signal representative of the vehicle speed being substantially zero. On the other hand, in case of "NO", indicative of the vehicle speed being not zero, the processing is completed.

Figure 10:
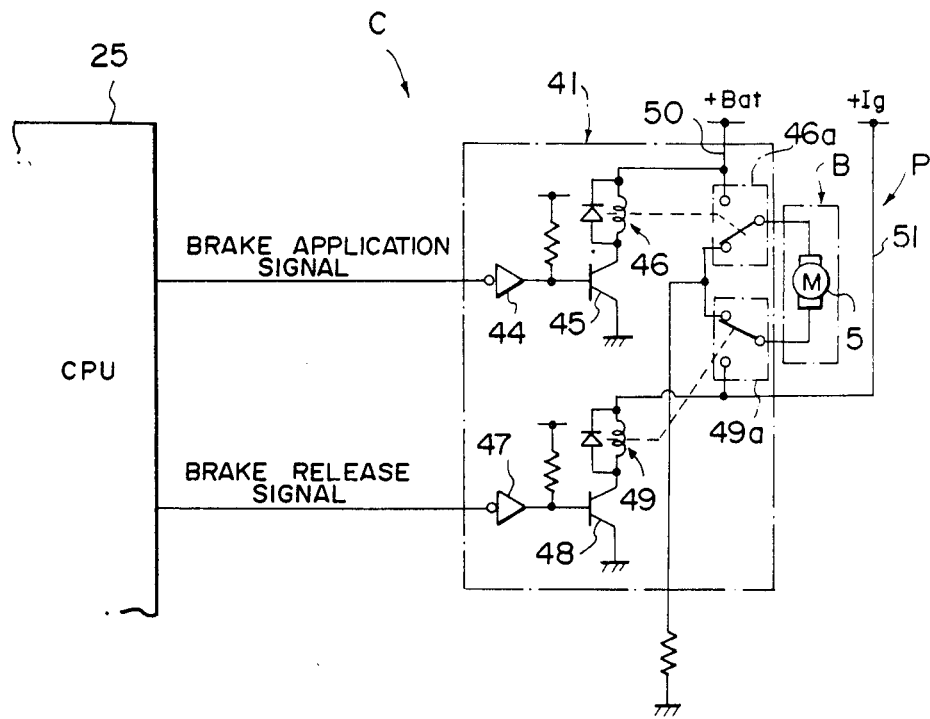
FIG. 10 is a circuit diagram showing an example of a motor drive circuit of FIG. 2.

FIG. 10 illustrates one example of the motor drive circuit 41 which comprises a first inverter 44 operable to invert the brake application command signal of a low level from the CPU 25; a first transistor 45 adapted to be saturated by a high level signal from the first inverter 44; a brake applying relay 46 adapted to be turned on upon saturation of the first transistor 45; a second inverter 47 operable to invert the brake release command signal of a low level from the CPU 25; a second transistor 48 adapted to be saturated by a high level signal from the second inverter 47; and a brake releasing relay 49 adapted to be turned on upon saturation of the second transistor 48. On the other hand, connected with the motor 5 of the electromagnetic means B are a forward drive circuit 50 for driving the motor 5 to rotate in the forward direction and a reverse drive circuit 51 for driving the motor 5 to rotate in the reverse direction, these circuits 50, 51 being arranged in parallel relation with each other. The forward drive circuit 50 is connected to the power source Bat, a battery, through a normally open contact switch 46a of the brake applying relay 46 so that when the switch 46a is closed upon turning on of the brake applying relay 46, current is supplied from the battery Bat to the motor 5, thereby driving the motor 5 to rotate in the forward direction. Also, the reverse drive circuit 51 is connected to the ignition power source Ig through a normally open contact switch 49a of the brake releasing relay 49 so that when the switch 49a is closed upon turning on of the brake releasing relay 49, current is supplied from the ignition power source Ig to the motor 5, thereby driving the motor 5 to rotate in the reverse direction. Consequently, a power supply circuit P is constructed which serves to supply current from the battery Bat to the motor 5 when the manual brake application switch 23 is turned on, that is, when the switch means F is put into a brake application position, and which on the other hand acts to supply current from the ignition power source Ig to the motor 5 when the manual brake release switch 24 is turned on, that is, when the switch means F is put into a brake release position.

Accordingly, in the case where the parking brake A is operated in the manual control mode, power is supplied to the motor 5 of the electromagnetic means B from the ignition power source Ig under the control of the power supply circuit P when the manual brake release switch 24 is switched on, so that the motor 5 is energized to release the parking brake A only when an ignition switch (not shown) is turned on, whereas the motor 5 is de-energized and hence the parking brake A is not released when the ignition switch is cut off to place the engine out of operation. As a consequence, during parking of the vehicle, wherein the engine is stopped with the parking brake A being applied, the parking brake A is not inadvertently released even if some person such as a child should turn on the manual brake releasing switch 24 in the absence of the operator, whereby the vehicle parked is prevented from moving by accident due to the operation of the parking brake A, thus improving the safety in parking to a practical extent.

On the other hand, in case where the manual brake application switch 23 is turned on, power is supplied to the motor 5 from the battery Bat under the control of the power supply circuit P so that the motor 5 is actuated to apply the parking brake A irrespective of the engine operating conditions due to the switching operation of the ignition switch. This ensures good versatility in the operation of the parking brake A and is desirable from the safety aspect.

FIG. 11 illustrates one example of the circuit arrangement including the shift position sensor interface 30, the inclination sensor interface 31 and the automatic control prohibition circuit 37. As shown in FIG. 11, the shift position sensor interface 30 comprises a first inverter 55 adapted to receive, through an OR circuit 54 including three diodes 54a-54c, a D-range signal, a first-range signal or a second-range signal, which signals are produced by the shift position sensor 15 when the shift gear of the transmission is in the position of the driving range, the first-speed range or second-speed range, respectively, and to send out a forward drive shift position signal of a low level; and a second inverter 57 adapted to receive a reverse range signal representative of the reverse range of the shift gear from the shift position sensor 15 through a diode 56 and to send out a backward drive shift position signal of a low level. The inclination sensor interface 31 comprises a first comparator 58 operable to compare the inclination signal from the inclination sensor 21 with a first reference voltage which corresponds to a first ascending inclination $+\theta 1$ as set by resistances R1 and R2, and to produce a signal +θ1 of a low level when the inclination signal from the inclination sensor 21 is greater than the first reference voltage; a second comparator 59 operable to compare the inclination signal from the inclination sensor 21 with a second reference voltage corresponding to a second ascending inclination +θ2, which is greater than the first inclination +θ1 and set by resistances R3 and R4, and to produce a signal +θ2 of a low level when the inclination signal from the inclination sensor 21 is greater than the second reference voltage; a third comparator 60 operable to compare the inclination signal from the inclination sensor 21 with a third reference voltage which corresponds to a first descending inclination −θ1 as set by resistances R5 and R6, and to produce a signal −θ1 of a low level when the inclination signal from the inclination sensor 21 is greater than the third reference voltage; and a fourth comparator 61 operable to compare the inclination signal from the inclination sensor 21 with a fourth reference voltage corresponding to a second descending inclination −θ2, which is greater than the first descending inclination −θ1 and set by resistances R7 and R8, and to produce a signal −θ2 of a low level when the inclination signal from the inclination sensor 21 is greater than the fourth reference voltage. The automatic control prohibition circuit 37 comprises a first AND circuit 63 adapted to produce a signal representative of the starting of the vehicle on a descending slope upon receipt of both the forward drive shift position signal from the first inverter 55 of the shift position sensor interface 30 and a high level signal representative of non −θ2 from the fourth comparator 61 of the inclination sensor interface 31, inverted by an inverter 62; a second AND circuit 64 adapted to produce a high level signal representative of the backward starting of the vehicle on an ascending slope upon receipt of both the backward drive shift position signal from the second inverter 57 of the shift position sensor interface 30 and the signal +θ2 from the second comparator 59 of the inclination sensor interface 31; an OR circuit 65 adapted to put out an automatic control prohibition signal of a high level to the CPU 25 upon receipt of one of the three signals which comprises a downhill starting signal from the first AND circuit 63, an uphill backward starting signal from the second AND circuit 64 and a manual control mode shift signal which is generated when it is necessary to shift the operation of the parking brake A to a manual control mode except where the vehicle is started on an ascending or a descending slope. It should be noted also that the shift position sensor interface 30 is provided with two malfunction preventing circuits 66, 67 each composed of a resistor and a condenser, these circuits 66, 67 serving to prevent erroneous operations of the shift position sensor interface 30 due to chattering of the shift position sensor 15. Also, the inclination sensor interface 31 has a surge absorbing diode 68, a differential circuit 69 for preventing fluctuation in the output of the inclination sensor 21 and a voltage follower 70.

With the above arrangement, the OR circuit 65 of the automatic control prohibition circuit 37 acts to send out an automatic control prohibition signal to the CPU 25 upon receipt of the downhill starting signal from the first AND circuit 63 at the time of starting of the vehicle on a descending slope with an inclination smaller than the angle of −θ2, or upon receipt of the uphill backward starting signal from the second AND circuit 64 at the time of backward starting of a vechicle on an ascending slope with an inclination greater than the angle of +θ2. Thus, there is provided an automatic control prohibiting means G3 which serves to prohibit the parking brake A from being automatically released in the automatic control mode, judging from the presence or absence of the automatic control prohibition signal, as seen from FIG. 3.

As a result, in a case where the vehicle is started to move in the forward direction on a descending slope having an inclination smaller than the angle of −θ2 or in the backward direction on an ascending slope having an inclination greater than +θ2, automatic release of the parking brake A in accordance with the automatic control mode is prohibited by the automatic control prohibiting means G3 so that the vehicle is prevented from rapid starting and can be started to travel in a smooth fashion as the parking brake A is released gradually in accordance with the manual control mode, thus ensuring safety in the starting operation of the vehicle.

Further, at the time when the vehicle is moved back with the shift position of the transmission in the reverse range, the automatic control prohibition circuit 37 puts out an automatic control prohibition signal to the CPU 25 based on the backward drive shift position signal from the second inverter 57 of the shift position sensor interface 30, so that the application or release of the parking brake A in accordance with the automatic control mode is prohibited as shown in FIG. 3. Accordingly, even in a situation wherein the vehicle is stopped repeatedly during backing up, the parking brake A is positively prevented from repeated applications and releases, thus enabling the vehicle to move back smoothly into a garage or a desired place. On the other hand, during the backward travel requiring application or release of the parking brake A, the brake can be applied or released as the operator desires by switching on the manual brake application switch 23 or the manual brake release switch 24.

It will be readily appreciated that the present invention is not limited to the above-described embodiments but may include a variety of modifications thereof. Although in the embodiments illustrated, the present invention is applied to the parking brake A which is constructed such that the rear disc brakes 1, 1 are applied or released by drawing or slackening the parking brake cable 2, it is also applicable to various types of parking brakes such as, for example, one in which the brakes are applied or released by engagement or disengagement of gears in a transmission.

Similarly, for the electromagnetic means B for controlling the application and release of the parking brake A, there may be employed, in place of the motor 5 as in the above embodiment, many kinds of electromagnetic actuators such as electromagnetic values.

In addition, in the above embodiments, the switching operation prohibiting means G1 is constructed such that when the vehicle speed is greater than a definite level, the switching operations of all the switches 22 to 24 are prohibited so as to disable both the automatic control and the manual control of the parking brake A, but it may of course be constructed such that only the manual control switches 23, 24 is prohibited from operation while permitting the switching operation of the automatic control switch 22. In this case, there will be no problem in safety because the automatic control of the parking brake A is effected based on the judgement that the vehicle speed is nearly zero.

We claim:

1. An electric parking brake system for a vehicle comprising: a parking brake; an electromagnetic means operable to apply and release said parking brake; a command signal producing means adapted to put out a brake application command signal or a brake release command signal to said electromagnetic means; a switch means adapted to be manually operated to switch the operation of said command signal producing means between a manual brake application and brake release control mode and an automatic control mode; a power supply circuit having a battery and an ignition power source for supplying power to said electromagnetic means, said power supply circuit being operatively connected with said switch means in a manner such that power is supplied to said electromagnetic means from said battery when said switch means is manually operated to switch said command signal producing means into the manual brake application control mode, and from said ignition power source when said switch means is manually operated to switch said command signal producing means into the manual brake release control mode.

2. An electric parking brake system for a vehicle as defined in claim 1, further comprising sensor means adapted to detect the operating conditions of the vehicle and put out signals representative of the vehicle operating conditions detected to said command signal producing means so as to control the latter in the automatic control mode, said sensor means having a shift position sensor for detecting a reverse range shift position of a transmission and producing a reverse range shift position signal representative of said transmission in the reverse range shift position; and an automatic control prohibiting means adapted to prohibit, upon receipt of said reverse range shift position signal from said shift position sensor, the brake applying and brake releasing operations of said parking brake in accordance with the automatic control mode during backward travel of the vehicle.

3. An electric parking brake system for a vehicle as defined in claim 1, further comprising sensor means adapted to detect the operating conditions of the vehicle and put out signals representative of the vehicle operating conditions detected to said command signal producing means, said sensor means having an acceleration sensor for detecting the depression of an accelerator pedal so as to produce an acceleration signal representative of the accelerator pedal depression detected and an inclination sensor for detecting the inclination of the vehicle so as to produce an inclination signal representative of the vehicle inclination detected, said command signal producing means being operated, upon receipt of said acceleration signal from said acceleration sensor, to put out a brake release command signal to said electromagnetic means; and an automatic control prohibiting means adapted to receive said inclination signal from said inclination sensor and prohibit the brake releasing operation of said parking brake in accordance with the automatic control mode when the vehicle is started to move forward on a descending slope of an inclination greater than a preset value.

4. An electric parking brake system for a vehicle as defined in claim 1, further comprising a vehicle speed sensor for detecting the speed of the vehicle so as to produce a vehicle speed signal representative of the vehicle speed detected; and a switching operation prohibiting means adapted to receive said vehicle speed signal from said vehicle speed sensor and prohibit the switching operation of said switch means when the vehicle speed is greater than a preset level.

5. An electric parking brake system for a vehicle as defined in claim 4, further comprising a foot brake adapted to be operated to brake the vehicle during travel, and wherein said switching operation prohibiting means is constructed such that it is disabled when said foot brake is abnormal in operation.

6. An electric parking brake system for a vehicle as defined in claim 1, further comprising sensor means adapted to detect the operating conditions of the vehicle and put out signals representative of the vehicle operating conditions detected to said command signal producing means, said sensor means having a vehicle speed sensor for detecting the vehicle speed so as to produce a vehicle speed signal representative of the vehicle speed detected and a foot brake sensor for detecting the depression of a foot brake so as to produce a foot brake signal representative of the foot brake depression, said command signal producing means being adapted to receive the signals from said sensor means and put out a brake application command signal to said electromagnetic means when it is judged that the vehicle speed is so small that the vehicle can be regarded to have stopped; and a parking brake application prohibiting means adapted to receive the vehicle speed signal and the foot brake signal respectively from said vehicle speed sensor and said foot brake sensor and set a parking brake application prohibiting time, during which the application of said parking brake is prohibited, in accordance with the traveling conditions of the vehicle when braked.

7. An electric parking brake system for a vehicle as defined in claim 6, wherein said parking brake application prohibiting means is constructed such that it sets the parking brake application prohibiting time based on the judgement that the decelerating rate of the vehicle speed exceeds a definite value.

8. An electric parking brake system for a vehicle as defined in claim 6, wherein said parking brake application prohibiting means is constructed such that it sets the parking brake application prohibiting time in accordance with the vehicle speed so that the application of said parking brake is prohibited for the period of time set after said foot brake is applied.

* * * * *